United States Patent

[11] 3,615,867

[72] Inventors Everett R. Cich;
 Robert C. Ivey, both of Madison, Wis.
[21] Appl. No. 841,016
[22] Filed July 11, 1969
[45] Patented Oct. 26, 1971
[73] Assignee ESB Incorporated

[54] METHOD OF ASSEMBLING A BATTERY WITH INTERCELL CONNECTORS
2 Claims, 3 Drawing Figs.
[52] U.S. Cl. ................................................... 136/175,
 136/111, 136/135
[51] Int. Cl. ................................................. H01m 5/00,
 H01m 13/10
[50] Field of Search ........................................... 136/87,
 108, 110, 111, 134, 135, 173, 175

[56] References Cited
UNITED STATES PATENTS
2,487,985 11/1949 Ruben .......................... 136/111
2,666,800 1/1954 Hoynes ......................... 136/135 X Primary Examiner—Donald L. Walton
Attorneys—Joseph M. Corr, Alfred J. Snyder, Jr. and Robert H. Robinson ABSTRACT: A battery comprising a series of cells stacked one upon the other is disclosed wherein the cells are connected by intercell connectors which assure good electrical contact between cells and proper alignment of each cell with respect to the next. The intercell connector comprises a flat section with a series of radial extensions or ears projecting beyond the edge of the flat section. In assembly the flat section is welded to one electrode of one cell and another cell is then stacked on top with the ears of the interconnector being bent upwards and welded to the other cell to interconnect the cells and accurately align them with respect to each other.

PATENTED OCT 26 1971

3,615,867

INVENTORS.
Everett R. Cich
Robert C. Ivey 3,615,867

METHOD OF ASSEMBLING A BATTERY WITH INTERCELL CONNECTORS

BACKGROUND OF THE DISCLOSURE

This invention relates to batteries made up of individual cells stacked one upon another and connected in series in order to provide a battery for use in various electronic equipment. In the past, two common methods of interconnecting the cells have been used; namely, the single strap and the cup-type interconnector. In the single strap connection a single piece of metal strip is welded to one electrode of a first cell and to the electrode of opposite polarity of a second cell which is stacked on top of the first. In the cup-type of interconnector, a metal cup is welded to the one electrode of the first cell and the second cell is then forced down into the cup and spotwelded at one or more points so that a series connection is made between the cells. Neither of these methods have been extremely satisfactory since they have not overcome various problems encountered in stacking a group of cells on top of each other.

In the case of the single strap method the individual cells tend to move about and become loose, or are subject to shock and vibration which tend to loosen the stack. Also, these multicell stacks tend to buckle or lean over and therefore one cell does not maintain a fixed position relative to another. In those situations using a cup intercell connector, air pockets exist in spaces which result due to lack of perfect mating between cell and cup. When the stack of cells is potted or encapsulated in a potting resin, these air pockets contain trapped air which can be detrimental to battery structure when subject to high "G" forces. This is undesirable since such batteries are used in instruments subjected to such forces.

SUMMARY OF THE INVENTION

This invention has a primary goal of overcoming the above problems which have existed in the past in assembling multicell, stacked batteries for use in electronic equipment and the like. Therefore, an object of the invention is to provide a battery wherein the individual cells are interconnected with each other in such a manner that one cell is not free to move with respect to another cell and the battery stack as a whole does not tend to buckle or lean over. Therefore, with this invention a battery of stacked cells is provided requiring no separate jackets or other type of housing to hold and support the battery.

An additional object is to provide a battery stack of cells having no air pockets which can hold entrapped air when the stack is potted or encapsulated in a potting resin.

It is also an object of the invention to provide a battery wherein individual cells are interconnected in such a way as to assure good electrical connection between the cells.

This invention provides a battery wherein the individual cells are joined together by means of an intercell connector which comprises a flat section having several extensions projecting beyond the edges of the flat portion. The flat portion of the connector is welded to one electrode of a cell and on top of this is placed another cell. The extensions or ears which project beyond the flat portions of a connector are then bent upwards and are welded to the other cell thereby locking the two cells together. As a result, an excellent mechanical and electrical intercell connection is made which does not provide spaces for entrapping air when the battery stack is potted or encapsulated in a resin.

DESCRIPTION OF THE PREFERRED EMBODIMENTS

Figure 1:
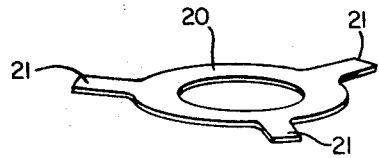
FIG. 1 is a planar view of an interconnector used in this invention.

Turning now to FIG. 1, there is shown an intercell connector used in this invention. The connector 20 is shown as a flat, annular piece of metal having three extensions or ears 21 projecting from the edge of the flat section. The intercell connector is preferably made of cold, rolled steel which if desired can be coated with such materials as cadmium, nickel, gold, and chromium in order to protect against corrosion or to improve the appearance of the connector and battery. Also the metal of the intercell connector should be compatible with the metal of the individual cells in order to reduce any form of corrosion due to dissimilar metal effects. In practice, the flat section of the connector is first welded to one electrode of one cell. Thereafter another cell is placed on top of the connector and the ears are bent upwards and welded to the electrode of opposite polarity of the stacked cell. Thus a mechanically rigid connection is made between the cells as well as a good electrical connection.

The connector in FIG. 1 is shown as having an annular center although the connector could be solid if desired. Normally, the annular connector is used since it facilitates the welding procedure by providing the open area in the center for one of the welding probes. However, with large cells the solid connector may be used since the cell electrode to which the flat center of the connector is to be welded is large enough that the welding probe that must contact the cell electrode can do so at a point on the electrode periphery. Other modifications of the connector are readily apparent such as punching a small hole in the flat section of the solid connector to provide a place for the welding probe to contact the cell electrode. With each type of connector however, a positive mechanical and electrical connection between cells is made. Although the annular connector appears to provide a space in its center to trap air, this has not been found to be very significant and both the annular and the solid connectors are decided improvements over the conventional cup connectors.

Figure 2:
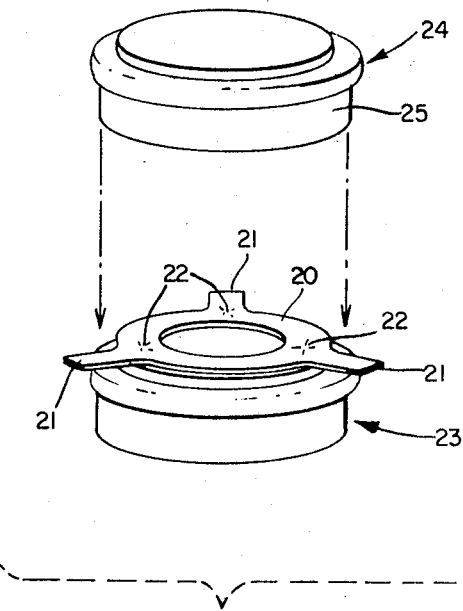
FIG. 2 is a perspective drawing of one cell about to be joined to another using an intercell connector of this invention.

FIG. 2 illustrates the manner in which one cell is connected to another using the intercell connector of FIG. 1. In this figure, the connector 20 has been spot welded at points 22 to the top positive electrode of cell 23. The connector ears 21 are shown extending out over the edges of the cell 23. A second cell 24 is about to be placed on top of the connector and after it has been in position the ears are bent upwards and welded to the sides of the negative electrode can 25 of the second cell. In practice, in assembling a battery a number of flat cells are stacked one on top of another with the intercell connector of FIG. 1 placed between each pair of the cells and with each connector welded to the top electrode of each cell except for the uppermost one. The stack of cells is placed within a cylindrical tube which has three vertical slots through and out from which extend the ears of the connectors. The stack of cells is held rigid within the tube by pressure at each end of the stack and the ears are then bent upward to make contact directly with the surface of the electrode can of the individual cell which has been placed on top of the connector. The ears are all then welded to the respective electrode cans in order to interconnect the cells to each other. After this welding takes place, the stack of cells can be removed from the tube and a rigid single battery structure is thereby formed. Depending on the height of the cylindrical tube, a variety of relatively rigid and straight cell stacks can be welded to various heights without buckling.

Figure 3:
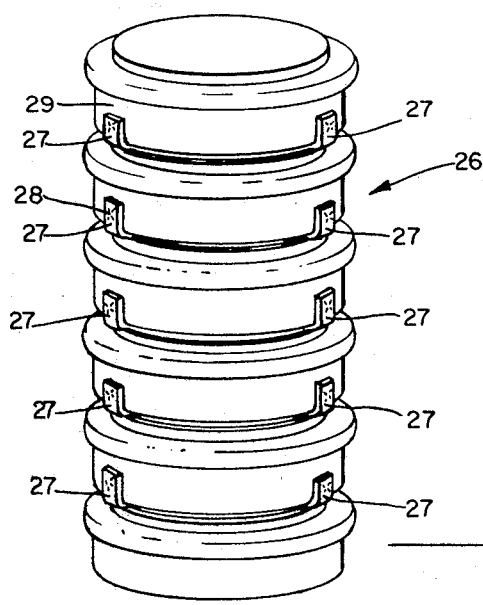
FIG. 3 is a perspective drawing of a stacked, multicell battery of this invention.

In FIG. 3 there is shown a stacked multicell battery which has been assembled as described in FIG. 2 using intercell connectors of the type shown in FIGS. 1 and 2. In viewing the figure there can be seen the connector ears 27 that have been bent upwards and spotwelded to the cell stacked next above as illustrated at 28. Cell 29 is the uppermost cell and its positive electrode terminal is the positive terminal for the battery. This stacked column of cells is not subject to buckling and the individual cells will not move but will remain fixed to each other. These features make this battery stack desirable for use in electronic equipment which has somewhat stringent space displacement requirements. It is customary practice to pot or encapsulate a battery stack of the type shown in FIG. 3 in a potting resin. When this is done to the stack of FIG. 3 there are no air pockets formed in the resin as often happens when the cup-type intercell connectors are used. This is another important advantage of using the intercell connector described herein in multicell battery stacks.

Although a particular shape and type of interconnector has illustrated and described, it is not intended to limit this invention to this particular design, but rather the scope of the invention is intended to cover modifications apparent to those skilled in the art. For example, the number of ears on the intercell connector could be varied. Although the preferred number of ears is three as shown in the figures, it is possible to have two or four ears or some other suitable number.

What we claim is:

1. A method of assembling a battery comprising two cells interconnected by a conductive intercell connector, said intercell connector comprising a flat section and two or more ears projecting beyond the edge of said flat section, said method comprising spotwelding said interconnector flat section to one electrode of a first cell, stacking a second cell on top said flat section, bending said ears upward and into contact with an electrode of said second cell and spotwelding said ears to said second cell electrode.

2. The method of claim 1 wherein said intercell connector has a hole in its flat section to permit a welding probe to contact said electrode of said first cell and thereby facilitate welding said intercell connector to said electrode of said first cell.